United States Patent
Komatsu et al.

[11] Patent Number: 6,132,639
[45] Date of Patent: Oct. 17, 2000

[54] MANGANESE-NICKEL MIXED HYDROXIDE FOR BATTERY ACTIVE MATERIAL AND PROCESS FOR MANUFACTURING THEREOF

[75] Inventors: Kazuhito Komatsu; Sumihiko Makizoe; Tsuneyoshi Kamada; Yasuhiro Ochi; Takashi Okito, all of Takehara, Japan

[73] Assignee: Mitsui Mining & Smelting Company, Ltd., Japan

[21] Appl. No.: 09/261,836

[22] Filed: Mar. 3, 1999

[30] Foreign Application Priority Data

Mar. 5, 1998 [JP] Japan ................................. 10-053312
Apr. 24, 1998 [JP] Japan ................................. 10-114545

[51] Int. Cl.$^7$ ............................. H01M 4/52; H01M 4/88
[52] U.S. Cl. ................... 252/182.1; 429/218.2; 429/223; 429/224
[58] Field of Search ................... 252/182.1; 429/218.2, 429/223, 224

[56] References Cited

U.S. PATENT DOCUMENTS

| Re. 34,752 | 10/1994 | Oshitani et al. | 252/182.1 X |
|---|---|---|---|
| 3,752,706 | 8/1973 | Melin | 252/182.1 |
| 5,508,121 | 4/1996 | Sawa | 429/223 X |
| 5,569,562 | 10/1996 | Glemser et al. | 429/223 |
| 5,670,271 | 9/1997 | Axmann | 429/223 X |
| 5,674,643 | 10/1997 | Yano et al. | 429/233 |
| 5,691,086 | 11/1997 | Baba et al. | 429/218.2 |
| 5,700,596 | 12/1997 | Ikoma et al. | 252/182.1 X |
| 5,861,225 | 1/1999 | Corrigan et al. | 429/233 |
| 5,905,003 | 5/1999 | Young et al. | 252/182.1 X |

*Primary Examiner*—Richard D. Lovering
*Attorney, Agent, or Firm*—Bierman, Muserlian and Lucas

[57] ABSTRACT

A manganese-nickel mixed hydroxide for battery active material comprising a manganese-containing mixed hydroxide having a coated layer composed of a mixed-oxide of nickel and cobalt, to provide an excellent discharging property and allows one to achieve an improvement in the discharge utilization when it is used as an electrode material for secondary batteries.

9 Claims, 1 Drawing Sheet

FIG. 1

MANGANESE-NICKEL MIXED HYDROXIDE FOR BATTERY ACTIVE MATERIAL AND PROCESS FOR MANUFACTURING THEREOF

BACKGROUND OF THE INVENTION

1. Field of the Invention

The present invention is directed to a manganese-nickel mixed hydroxide for battery active material and a process for the manufacturing thereof.

2. Description of the Related Art

Under circumstances that need to provide high energy density to batteries is required more and more, a nickel hydroxide positive electrode, which is commonly used for an alkaline storage battery, such as a nickel-cadmium storage battery and a nickel-metal hydride storage battery, is shifting from the sintered type to the paste type, which can provide high capacity and density to a battery. The paste-type nickel positive electrode has been produced by filling up nickel hydroxide powder together with an other metal powder, such as cobalt, into either a foam nickel plate or a nickel fiber plate, having a high porosity as much as 95%, and then pressing and molding the plate. Such foam nickel plates are obtained by plating a foam plastic, such as urethane, with nickel, and then heating and subjecting the plated plastic to thermal degradation.

In general, the reaction of nickel hydroxide as a positive electrode material for alkaline storage batteries during charging and discharging utilizes a reaction resulting in between $\beta$-Ni(OH)2 and $\beta$-NiOOH. This reaction is one electron reaction, however, this is the most stable reaction and it has therefore been commonly used.

When the reaction is changed to a multi electron reaction by utilizing a reaction which results in between $\beta$-Ni(OH)2 and $\gamma$-NiOOH, it is advantageous in increasing the capacity of batteries. However, in this case, there is a problem in the discharge reaction such that the discharge reaction being caused from $\gamma$-NiOOH, which is generated at charging and discharging, to $\beta$-Ni(OH)2 becomes difficult due to the difference in the lattice constants of $\beta$-Ni(OH)2 and $\gamma$-NiOOH.

There is also an advantage in increasing the capacity of batteries when the reaction between a $\alpha$-Ni(OH)2 and $\gamma$-NiOOH is utilized, as it is also an multi-electrons reaction. Furthermore, because of less difference in the lattice constants between $\alpha$-Ni(OH)2 and $\gamma$-NiOOH, it is more preferable to utilize this reaction as it allows a reduction in the change in the volume at charging and discharging.

However, it has been practically not feasible to utilize this reaction due to the fact that $\alpha$-Ni(OH)2 is unstable in an alkaline solution and it easily changes to $\beta$-Ni(OH)2.

For solving such problems as described above, it is an object of the present invention to provide a nickel hydroxide active material, which provides excellent discharging property and allows in particular to improve a discharge utilization, when such active material is used as an electrode material for batteries, and a process for the manufacture thereof.

SUMMARY OF THE INVENTION

The manganese-nickel mixed hydroxide for battery active material according to the present invention, which is aiming at solving the problem as described above, is a manganese containing mixed of hydroxide and is characterized in that the active material has a layer coated with a mixed-oxide of nickel and cobalt.

The manganese-nickel mixed hydroxide for battery active material of the invention is characterized in that the metal content in the layer coated with oxides may be in a range of from 2% by weight to 10% by weight relative to the weight of the mixed hydroxide in particles.

The manganese-nickel mixed hydroxide for battery active material according to the present invention is characterized in that the nickel content in the layer coated with oxides may be in a range of from 5% by weight to 20% by weight relative to the weight of metals contained in the layer coated with oxides.

The method for manufacturing the manganese-nickel mixed hydroxide for battery active material according to the present invention is characterized in that the mixed hydroxide for battery active material may be manufactured by first suspending the manganese-nickel mixed hydroxide into an aqueous solution containing a nickel salt, and then, the surface of the suspended particles are coated with nickel oxide by precipitating the nickel oxide in the solution onto the surface while continuously supplying both an alkaline solution and an aqueous solution containing ammonium ions, and the coated particles are then distributed into an aqueous solution containing a cobalt salt, and finally, the distributed particles are coated with the cobalt oxide by precipitating the cobalt oxide in the solution onto the surface while continuously feeding both an alkaline solution and an aqueous solution containing ammonium ions.

The method for manufacturing the manganese-nickel mixed hydroxide for battery active material according to the present invention is characterized in that the manganese-nickel mixed hydroxide may be manufactured by suspending the manganese-nickel mixed hydroxide in an aqueous solution containing a nickel salt and a cobalt salt, and then allowing a mixed-oxide of nickel and cobalt to precipitate onto the surface of the particles of the mixed hydroxide distributed in the solution while continuously feeding an alkaline solution and an aqueous solution containing ammonium ions to coat the surface with the mixed-oxide.

The manganese-nickel mixed hydroxide for battery active material according to the present invention may be also manufactured by suspending manganese-nickel mixed hydroxide powder in a basic nickel-ammonia complex solution and coprecipitating the mixed-oxide of nickel and cobalt to form a coating layer thereof while continuously feeding a cobalt solution into the nickel-ammonia complex solution in the presence of an alkaline solution.

The inventive process for manufacturing the manganese-nickel mixed hydroxide for battery active material may be constituted of two steps, the one for suspending manganese-nickel mixed hydroxide powder in a basic nickel-ammonia complex solution and the other for precipitating the mixedoxide of nickel and cobalt onto the surface of the manganesenickel mixed hydroxide in particles to form a coating layer of the complex while continuously feeding a cobalt solution into the nickel-ammonia complex solution in the presence of an alkaline solution.

Whereas, the inventive process for manufacturing the manganese-nickel mixed hydroxide for battery active material may be constituted of the following steps, first adding an alkaline solution into a basic nickel-ammonia complex solution and then further adding an alkaline solution together with a cobalt solution.

Further, in the inventive process for manufacturing the manganese-nickel mixed hydroxide for battery active material, a process for coating a mixed-oxide of nickel and cobalt may be carried out under an inert gas atmosphere.

PREFERRED EMBODIMENTS OF THE INVENTION

Now, the present invention is described in detail, but it should be noted that the present invention shall not be limited to the scope which is specified in the embodiments as described below.

It is an object of the present invention to provide manganese-nickel mixed hydroxide powder which can gain a higher discharge utilization by forming either plural coating layers respectively composed of nickel oxide and cobalt oxide or a coating layer with a mixed-oxide of nickel and cobalt on the surface of the manganese-nickel mixed hydroxide in particles.

In this invention, it is preferable that the metal contents of nickel oxide and cobalt oxide in the layer coated with a oxide is in a range of from 2% by weight to 10% by weight relative to the weight of the mixed hydroxide in particles.

In case the content is less than 2% by weight, as described in the example below, it is difficult to gain a sufficient conductivity since the discharge utilization is too low and the thickness of the coated layer becomes too thin. When the content exceeds 10% by weight, it is likely that protons tend to be less dispersible when a thickness of the coated layer is too thick.

Furthermore, it is preferable that the nickel content in the layer coated with oxides as described above is in a range of from 5% by weight to 20% by weight relative to the total metal content in the layer coated with the oxides.

This is due to the reason that, if the nickel content is less than 5% by weight, as described in the following example, there could be a flocculated lump of fine particles which have not been successfully coated, and such lump dissolves in an alkaline solution to reduce the conductivity, and if the nickel content exceeds 20% by weight, the conductivity of the coated layer deteriorates due to the presence of too much nickel, which leads to a decrease of the discharge utilization.

Now, the manufacturing method of manganese-nickel mixed hydroxide having a layer coated with a metal oxide is described in the following.

An example of a process for manufacturing the manganesenickel mixed hydroxide is shown in the following.

The manganese-nickel mixed hydroxide to be used as an object for the coating in the present invention shall not be limited to specific ones, however, it is preferable to use the one which is manufactured according to the following process.

A solution of nickel sulfate and manganese sulfate, which contains nickel and manganese in a ratio of 9:1, being adjusted to a concentration of 1.75 mol/l, ammonium solution at a concentration of 6.5 mol/l and aqueous solution of sodium hydroxide at a concentration of 6 mol/l were prepared, respectively. Nitrogen gas was fed at a speed of 1 liter/min. into the solution by bubbling. The amount of dissolved oxygen at the time of bubbling was found to be 0.2 mg/l. Nickel salt solution and ammonia solution were concurrently supplied into a reactor having a volume of 7.2 L at a speed of 10 ml/min. and 6.2 ml/min., respectively, while maintaining the temperature of those solutions at 30° C., and the solutions were mixed to immediately make it homogeneous. While maintaining the temperature in the reactor at 30° C., sodium hydroxide solution at a concentration of 6 mol/l was supplied into the reactor at an average speed of 6.2 ml/min. and then stirred to maintain the pH in the reactor in a range of 12.5±0.2.

The amounts of sodium hydroxide and ammonia were adjusted to 2.1 and 2, respectively, relative to 1 as the total amount of nickel salt and manganese salt.

The produced hydroxide complex was overflowed from the upper part of the reactor to take it out continuously. The average retention time in this process was 6 hours, and sampling was made after continuous running of this operation for 6 hours. Then, the sample was washed with water, filtered and dried with air at 80° C. for 1 week to obtain the particles of the manganese-nickel mixed hydroxide. From a result by quantitative analysis, manganese content in this state was found to be 10 mol % as metal atom ratio, which agrees with the mixing ratio of the starting materials. The sample was confirmed as formed into crystals having an homogeneous composition, because only a peak resulting from nickel hydroxide was observed from the data.

As a nickel salt in the present invention, its sulfate, nitrate, chloride, etc. can be used, while as a manganese salt, its chloride, sulfate, etc. can be used, for example.

As the alkaline solution used in the present invention, although there is no limitation, however, it is preferable to use sodium hydroxide.

As the reactor used in this embodiment, it is preferable to use one whose interior can be completely closed, since nickel hydroxide is manufactured under a dissolved oxygen concentration lower than 0.5 mg/l in the solution in a reactor by introducing an inert gas and a reducing gas to the reactor before and during the manufacturing of nickel hydroxide. This is because an unfavorable oxidation may result during the manufacturing when the dissolved oxygen concentration exceeds 0.5 mg/l.

As examples for the inert gas to be introduced, argon, nitrogen, helium, etc. can be used, and these gases are introduced into a reactor by bubbling to prevent the dissolved oxygen concentration from exceeding 0.5 mg/l.

It is preferable to continuously supply nickel salt solution containing manganese, an alkaline solution and an aqueous solution of ammonium ions into a reactor.

It is preferable to use a ratio of Ni/Mn in a range of from 95/5 to 85/15, and for that, it is preferable to use Ni/Mn sulfates solution adjusted to 1.75 mol/l, aqueous ammonia as an ammonia solution prepared at a concentration of 6.5 mol/l and sodium hydroxide as an alkaline solution prepared at a concentration of 6 mol/l, for example.

In the present embodiment, nickel salt solution containing manganese is supplied at a speed of from 5.0 ml/min. to 18.0 ml/min., and more preferably at 10 ml/min., whereas the ammonia solution is supplied at a speed of from 3.0 ml/min. to 11.0 ml/min., and more preferably at 6.2 ml/min.

This is because it is not preferable to allow the supply rate too slow as the specific surface area becomes too small and the average oxidation number of manganese after drying gets low as much as 3.1.

On the other hand, it is not preferable as well if the supply rate is too fast as the particles form a flocculated lump which might be the cause of leading to an unsuccessful reaction.

Although it depends on the supply rate, it is preferable to fix the average retention time in a range of from 3 to 12 hours.

Further, it is preferable to supply nickel salt solution containing manganese and an ammonia solution concurrently.

This is because if those solutions are not supplied concurrently, namely the deposition speed, becomes extremely fast, thereby causing flocculation of the fine particles which makes it difficult to obtain sufficient tap density.

The reaction is preferably proceeded by maintaining the reaction temperature in a range of 25 to 40° C., and more preferably at around 30° C.

This is because the specific surface area becomes unfavorably small, if the temperature exceeds 40° C., while apparent density becomes too low, if the temperature gets below 25° C.

The pH for the reaction is preferably maintained in a range of from 12 to 13, and more preferably at around 12.5.

If the pH is lower than 12, a tap density becomes too low, while specific surface area becomes too small, if the pH exceeds 13, though tap density will be kept at a high level.

Then, nickel hydroxide obtained is filtered, washed, dehydrated, and then further dried.

This drying process shall be carried out in air at a temperature higher than 70° C., and more preferably at 80° C., for at least 16 hours, and more preferably approximately for a week (7 days), and the nickel hydroxide, of which oxidation has been prevented under inert gas atmosphere during the reaction, will be oxidized in the drying process.

The manganese-nickel mixed hydroxide for battery active material according to the present invention obtained as described above has a tap density of more than 1.9 g/cc and a specific surface area of more than 8 m2/g, and a space volume in the pores of the active material is more than 0.01 cm3/g, and a volume of pores in the active material having a pore radius of more than 30 Å does not exceed a range of more than 40% of the total pore volume, and the manganese content in the active material is in a range of from 5% by mol to 15% by mol, and the average oxidization of manganese in the active material is 3.5 or more.

In the nickel hydroxide complex active material of the present invention, the manganese content therein is fixed in a range of from 5 mol % to 15 mol %. This is because if the content is lower than 5 mol %, a tap density gets too low, which leads to a decrease in the discharge utilization. If the content exceeds 15 mol %, though the discharge utilization is improved, a tap density remains at a low value, which makes it unfavorable for obtaining the active material according to the present invention.

The manganese-nickel mixed hydroxide of the present invention is in eutectic and/or solid soluble state. By means of containing manganese atoms in eutectic and/or solid soluble state in the crystals of the nickel hydroxide, it allows to improve the mobility of protons which move in the crystal lattice during charging and discharging, which allows fast completion of charging and discharging reactions. If the manganese atoms exist in a separate and precipitated state, not in a solid soluble state, only nickel hydroxide can participate to a reaction, and it thereby makes difficult to obtain a sufficient discharge utilization.

The first embodiment for the inventive process for manufacturing the manganese-nickel mixed hydroxide is constituted of the following steps, a step to distribute a manganese-nickel mixed hydroxide in an aqueous solution containing a nickel salt, a step to coprecipitate and coat nickel oxide onto the surface of the distributed mixed hydroxide in particles while continuously supplying an alkaline solution and an aqueous solution containing ammonium ions to form a coated layer of nickel oxide thereon, a step to distribute the coated nickel hydroxide particles into an aqueous solution containing a cobalt salt, a step to precipitate and coat a cobalt oxide onto the surface of the nickel hydroxide in particles while continuously supplying an alkaline solution and an aqueous solution containing ammonium ions, and a step to form a coating layer of the cobalt oxide on the surface of the layer of nickel oxide.

The second embodiment for the inventive process for manufacturing the manganese-nickel mixed hydroxide is constituted of the following steps, a step to distribute the manganese-nickel mixed hydroxide obtained as described above into an aqueous solution containing a cobalt salt and a step to coprecipitate and coat a mixed-oxide of nickel and cobalt on the surface of the mixed hydroxide in particles while continuously supplying an alkaline solution and an aqueous solution containing ammonium ions to form a coated layer of the mixed-oxide of nickel and cobalt.

According to the present invention, a high discharge utilization can be provided by forming plural coated layers respectively composed of nickel oxide and cobalt oxide or a coated layer of a mixed-oxide of nickel and cobalt on the surface of the manganese-nickel mixed hydroxide for battery active material, and when using the inventive active material as an electrode material for a secondary battery, it is possible to obtain an excellent discharging property, in particular, an improved utilization rate with the inventive active material.

According to the present invention, it is also possible to provide manganese-nickel mixed hydroxide powder, which can gain a higher discharge utilization while keeping a high tap density, by suspending the manganese-nickel mixed hydroxide powder in a solution of basic nickel-ammonia complex, supplying continuously a cobalt solution in the presence of an alkaline solution and precipitating a mixed-oxide of nickel and cobalt to form a coated layer, at the time of forming a coated layer composed of nickel oxide and cobalt oxide on the surface of the particles of the manganese-nickel mixed hydroxide.

In this embodiment, it is preferable that the metal content in the coated layer of the mixed-oxide of nickel and cobalt, is in a range of from 2% by weight to 10% by weight relative to the weight of the mixed hydroxide in particles.

This is because it is difficult to obtain sufficient conductive property because of low discharge utilization and the thickness of the coated layer being so thin, if the content is less than 2% by weight, while the dispersion of protons in the particles becomes difficult it too thick in the thickness of the coated layer, when the content exceeds 10% by weight.

Again, the nickel content in the layer coated with the complex of oxides is preferably in a range of from 5% by weight to 20% by weight relative to the metal content in the layer coated with the mixed-oxide.

This is because there could be a flocculated lump of fine particles which have not been successfully coated when the nickel content is less than 5% by weight, and the lump dissolves in an alkaline solution, which causes a decrease in the electric conductivity, and on the other hand, if the content exceeds 20% by weight, too much nickel content may cause a decrease in the electric conductivity of the coated layer, which causes a decrease in the discharge utilization.

The third embodiment for the inventive process for manufacturing the manganese-nickel mixed hydroxide for battery active material is constituted of the following steps, a step of suspending manganese-nickel mixed hydroxide powder in a solution of basic nickel-ammonia complex and a step of coprecipitating a mixed-oxide of nickel and cobalt to form a coated layer of the mixed-oxides on the surface of the manganese-nickel mixed hydroxide in particles while continuously feeding a cobalt solution in the presence of an alkaline solution.

In this embodiment, it is preferable to use sodium hydroxide as an alkaline solution, for example, and such alkaline solution may be fed into the solution of basic nickel-ammonia complex beforehand, wherein the manganesenickel mixed hydroxide powder is suspended, or may be added to the complex solution concurrently with the addition of a cobalt solution.

When nickel-ammonia complex solution being highly alkaline with addition of sodium hydroxide is used, the oxides complex in a high concentration is precipitated on the surface of the suspended particles as the pH in the solution decreases with the addition of a cobalt solution, while reacting with nickel in the highly basic solution to form a coated layer of the complex of oxides. In this case, it is required to select the amount of ammonia appropriately depending upon the amount of sodium hydroxide to be used, as precipitation of nickel hydroxide may result when the amount of sodium hydroxide is increased too much.

Further, even though an alkaline solution, such as sodium hydroxide solution, was not added beforehand, a similar effect can be expected if it is added during the reaction.

In the case of adding both sodium hydroxide and ammonia into a cobalt solution containing nickel, although formation of a layer coated with the mixed-hydroxide can be done, unfavorable precipitation of a mixed-oxide of nickel and cobalt is generated from a low pH range, which makes improvement of a tap density difficult.

In the case that addition of an alkaline solution was not done, the pH in the solution decreases rapidly at the time that a cobalt solution is added, which makes difficult to obtain a good coating.

As described above, the manganese-nickel mixed hydroxide for battery active material according to the present invention allows one to obtain a high discharge utilization while keeping a high tap density by forming a coated layer of the mixed-oxide of nickel and cobalt on the surface of the manganese-nickel mixed hydroxide for battery active material in a basic nickel-ammonia complex solution. According to such an embodiment, it allows one to obtain an excellent discharging property, especially an improvement in the discharge utilization, when the inventive active material is used as a material for alkaline storage batteries, such as nickel-metal hydride battery, nickel-cadmium battery, and nickel-zinc battery.

Now, the present invention is further explained in detail with preferred examples. However, it should be noted that the present invention shall not be limited to the scope as specified in the following examples.

EXAMPLE 1

<Manufacturing a Manganese-nickel Mixed Hydroxide>

A solution of nickel sulfate and manganese sulfate, which contains nickel and manganese in a ratio of 9:1 and adjusted to a concentration of 1.75 mol/l, ammonia solution at a concentration of 6.5 mol/l and aqueous solution of sodium hydroxide at a concentration of 6 mol/l are prepared, respectively.

Nitrogen gas in an amount of 1 liter/min. was bubbled into the solution. The amount of dissolved oxygen in the solution after the bubbling was found to be 0.2 mg/l.

Nickel salt solution and ammonia solution were concurrently supplied to a reactor having a volume of 7.2 L at a speed of 10 ml/min. and 6.2 ml/min., respectively, while keeping the temperature of the solution at 30° C., and the solution was then mixed and stirred to immediately make the solution homogeneous.

While keeping the temperature in the reactor at 30° C., sodium hydroxide solution at a concentration of 6 mol/l was supplied to the reactor at an average speed of 6.2 ml/min. and the solution was then stirred to maintain a pH in the reactor at a range of 12.5±0.2.

The amounts of sodium hydroxide and ammonia were adjusted to 2.1 and 2, respectively, relative to a rate of 1 as the total amount of nickel salt and manganese salt.

The produced mixed hydroxide was overflowed from the upper part of the reactor to remove it continuously. The average retention time in this process was 6 hours, and a sampling was made after continuous running of this operation for 6 hours. Then the sample was washed with water, filtered and dried with air at 80° C. for 1 week to obtain a manganesenickel mixed hydroxide in particles.

From a quantitative analysis, the manganese content in this state was found to be 10 mol % as a metal atom ratio, which agreed with the mixing ratio of the starting materials. The sample was confirmed as crystals composed of an homogeneous composition as only a peak resulting from nickel hydroxide was observed from the data.

Further, the crystals were found to be spherical particles having a matching particle size from a SEM photograph.

By measuring the average valence number of manganese based on ferrous sulfate ammonium method, it was found that the valence is 3.7.

Tap density was determined by measuring the volume of the powder in an amount of 15 g placed in a 20 ml measuring cylinder after carrying out tapping 1,000 times based on an equation which was constituted of Weight placed/Volume measured. As a result of the measuring, it was found that the tap density of the fine particle powder according to the present example was 2.2 g/cc.

The specific surface area and volume of pores were measured by employing a nitrogen gas adsorption method. The specific surface area was 16 $m^2$/g, total pore volume was 0.02 cm3/g, and the ratio of the volume of pores having a diameter larger than 30 Å to the total volume of pores was found to be 30%.

<Coating of Plural Layers Respectively Composed of Nickel Oxide and Cobalt Oxide Onto the Surface of a Manganese-nickel Mixed Hydroxide>

1,000 ml of a nickel sulfate solution at a concentration of 0.01 mol/l were prepared, and 60 g of the particles of manganese-nickel mixed hydroxide, which was prepared separately, were dispersed into the solution and stirred at an ambient temperature. Then, an aqueous solution of sodium hydroxide was fed into aqueous solution of nickel sulfate up to a point that the ratio of alkali ions:nickel ions in numbers in the solution reached to 1:2.3. At the same time, ammonia solution was fed into an aqueoussolution of nickel sulfate up to a point that the ratio of ammonium ions:nickel ions in the nickel sulfate solution reached 1:12. In this example, it required 4 hours to complete the feeding of the ammonia solution. Such feeding time can be adjusted depending upon requirement, however, it was preferable to carry out such feeding within a time range of from 2 to 5 hours.

The nickel content obtained at this stage was 1% by weight relative to the weight of manganese-nickel mixed hydroxide powder. After washing and filtering the particles of nickel hydroxide which were taken out after the completion of the reaction, the particles were dried at 80° C. for 16 hours to obtain the nickel hydroxide in particles which were coated with nickel oxide. By means of SEM observation, the state of the coated material on the particles was checked.

Then, 1,000 ml of a solution of cobalt sulfate at a concentration of 0.05 mol/l were prepared, and 60 g of the nickel hydroxide being coated with nickel oxide as described above were dispersed into the solution and stirred at an ambient temperature.

Then, an aqueous solution of sodium hydroxide was fed into an aqueous solution of nickel sulfate up to a point that the ratio of alkaline ions:nickel ions in the nickel sulfate solution in numbers reached 1:2.3. At the same time, ammonia solution was fed into an aqueous solution of nickel sulfate up to a point that the ratio of ammonium ions:nickel ions in the nickel sulfate solution in numbers reached 1:2. In this example, it required 4 hours to complete the feeding. Such feeding time can be adjusted depending upon requirement, however, it is preferable to carry out such feeding within a time range of from 2 to 5 hours.

The nickel content obtained at this stage was 5% by weight relative to the weight of manganese-nickel mixed hydroxide powder.

After washing and filtering the particles of nickel hydroxide which were taken out after completion of the reaction, the particles were dried at 80 ° C. for 16 hours to obtain the particles which were coated with double layers respectively composed of nickel oxide and cobalt oxide. By means of SEM observation, the state of the coated material onto the particles was checked.

By quantitative analysis, the nickel content and the cobalt content at this stage were 1% by weight and 5% by weight, respectively, which accords to the expected values.

2 g of Metallic cobalt were admixed with 10 g of the obtained particles being coated with double layers respectively composed of nickel oxide and cobalt oxide. The mixture was then prepared into a paste state and filled into a porous nickel current collector and dried to prepare a pressed positive nickel electrode.

A closed nickel-metal hydride model cell test is constructed by using a hydrogen storage alloy as a negative electrode and an aqueous solution of potassium hydroxide at a concentration of 7.2 mol/l as an electrolyte.

Figure 1:
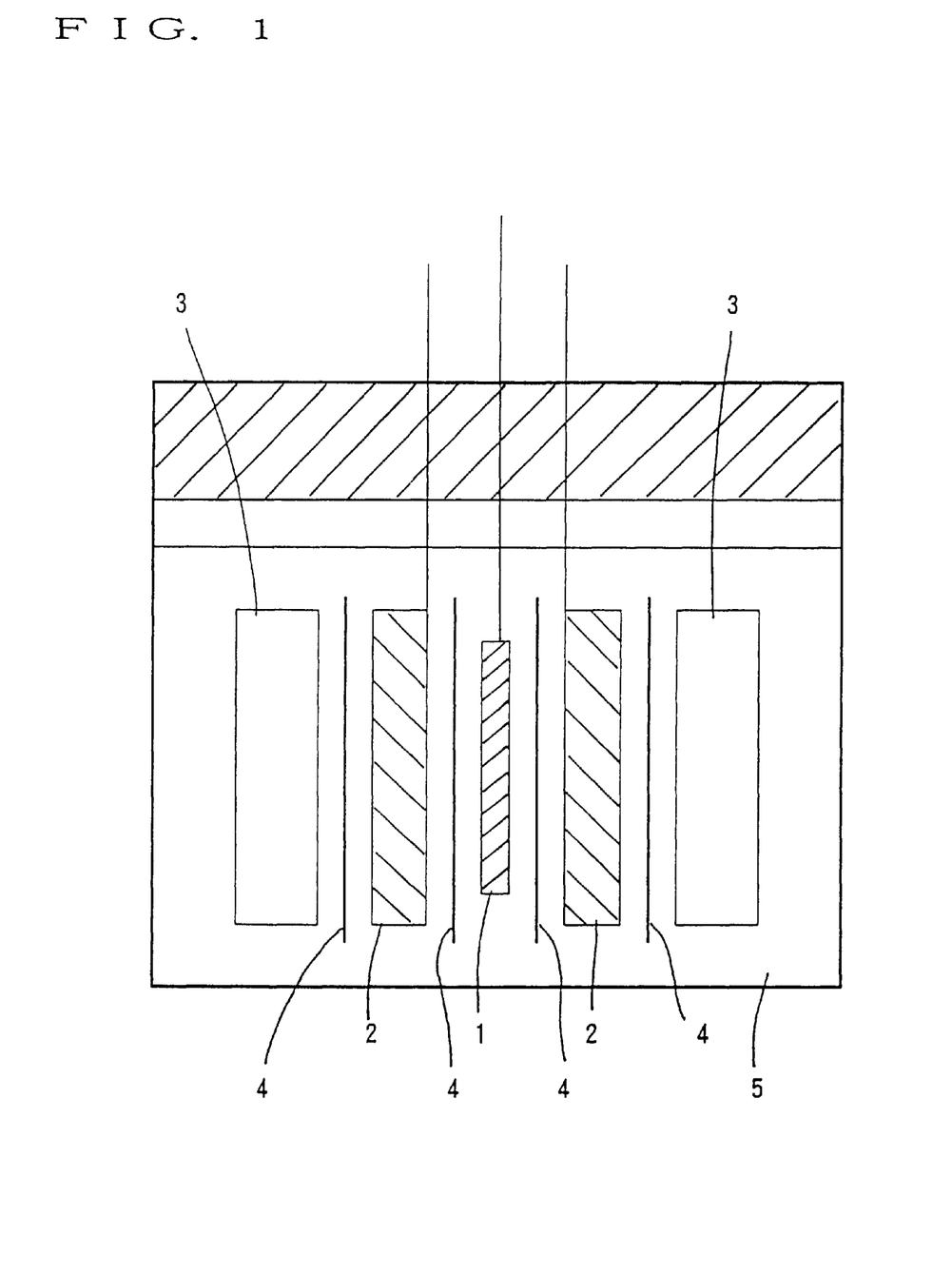
FIG. 1 shows a schematic diagram for the model cell used in the examples for the present invention.

An example for this model cell is shown in FIG. 1. Wherein 1 is a positive electrode (nickel electrode), 2 is a negative electrode (hydrogen storage alloy electrode), 3 is a plate for pressing resin, 4 is a separator made of PP (polypropylene) and 5 is electrolyte (7.2 mol/l KOH).

The discharge capacity was determined by causing discharge up to a level of 0.5V with current equivalent to 0.2 C following by charging with current equivalent to 0.1 C for 18 hours. The theoretical discharge capacity at oxidation and reduction of one electron was fixed as 100, and the value obtained by dividing a discharge capacity actually obtained by the theoretical discharge capacity was calculated as the discharge utilization.

At high current density test, a discharge capacity and discharge utilization are determined using current density of 1 C up to level of 0.5V following to charging current density of 1 C for 1.8 hours.

The results are shown in Table 1.

EXAMPLE 2

<Coating on the Surface of Manganese-nickel Mixed Hydroxide with Plural Layers Respectively Composed of Nickel Oxide and Cobalt Oxide>

1,000 ml of a mixed solution of nickel sulfate and cobalt sulfate at a concentration of 0.06 mol/l (Ni/Co=⅕) were prepared, and 60 g of manganese-nickel mixed hydroxide in particles were then dispersed into the mixed solution and stirred at an ambient temperature. Then, an aqueous solution of sodium hydroxide was fed into a mixed aqueous solution of nickel sulfate and cobalt sulfate to adjust the ratio of the amount of alkaline ions relative to the amount of metal ions contained in the mixed solution to 1:2.3. At the same time, an ammonia solution was fed into the mixed solution to adjust the ratio of the amount of ammonium ions relative to the amount of metal ions contained in the mixed solution to 1:2. At this stage, it was preferable to complete the feeding within a time range of from 2 to 5 hours.

The nickel content and the cobalt content obtained at this stage were 1% by weight and 5% by weight, respectively, relative to the weight of manganese-nickel mixed hydroxide powder. After washing and filtering the particles of nickel hydroxide which were taken out after completion of the reaction, the particles were dried at 80° C. for 16 hours to obtain the particles which were coated with nickel oxide. By SEM observation, the state of the coated material onto the particles was checked.

From quantitative analysis, the nickel content and the cobalt content at this stage were 1% by weight and 5% by weight, respectively, which corresponds to the expected values.

The particles obtained were used for producing the model cell by the method described in Example 1, and a discharge utilization of the model cell was then determined.

The results are shown in Table 1.

EXAMPLE 3

1,000 ml of an aqueous solution of nickel sulfate at a concentration of 0.005 mol/l, 1,000 ml an aqueous solution of cobalt sulfate at a concentration of 0.025 mol/l and 60 g of manganese-nickel mixed hydroxide in particles were prepared.

Using the same method as described in Example 1, two layers respectively composed of nickel oxide and cobalt oxide were coated onto the surface of the mixed hydroxide in particles.

The nickel content and the cobalt content obtained at this stage were 0.5% by weight and 2.5% by weight, respectively, relative to the weight of the manganese-nickel mixed hydroxide powder. By SEM observation, the state of the coated material onto the particles was checked. From quantitative analysis, it was found that the nickel content and the cobalt content at this stage were 0.5% by weight and 2.5% by weight, respectively, which corresponds to the expected values.

The particles obtained were used for producing the model cell by the method described in Example 1, and a discharge utilization of the model cell was then determined.

The results are shown in Table 1.

EXAMPLE 4

1,000 ml of an aqueous solution of nickel sulfate at a concentration of 0.005 mol/l, 1,000 ml of an aqueous solution of cobalt sulfate at a concentration of 0.055 mol/l and 60 g of manganese-nickel mixed hydroxide in particles were prepared.

Using to the same method as described in Example 1, two layers respectively composed of nickel oxide and cobalt oxide were coated onto the surface of the mixed hydroxide in particles.

The nickel content and the cobalt content obtained at this stage were found to be 0.5% by weight and 5.5% by weight, respectively, relative to the weight of the manganese-nickel mixed hydroxide powder. By SEM observation, the state of the coated material onto the particles was checked. By quantitative analysis, the nickel content and the cobalt content at this stage were found to be 0.5% by weight and 5.5% by weight, respectively, which correspond to the expected values.

The particles obtained were used for producing the model cell by the method described in Example 1, and a discharge utilization of the model cell was then determined.

The results are shown in Table 1.

COMPARISON EXAMPLE—1

By using manganese-nickel mixed hydroxide in particles having no coated layer with an oxide, a model cell was produced by the method described in Example 1, and a discharge utilization of the model cell was then determined.

The results are shown in Table 1.

COMPARISON EXAMPLE—2

1,000 ml of an aqueous solution of nickel sulfate at a concentration of 0.06 mol/l were prepared, and 60 g of manganese-nickel mixed hydroxide in particles were dispersed in the solution and stirred at an ambient temperature. Subsequently, an aqueous solution of sodium hydroxide is fed into the solution up to a point that a ratio of the amount of alkaline ions to the amount of nickel ions in the aqueous solution of nickel sulfate reached 1:2.3. At the same time, ammonia solution was fed into aqueous solution of nickel sulfate up to a point that a ratio of the amount of ammonium ions to that of nickel ions in the nickel sulfate solution rr reached 1:2. The nickel content obtained at this stage was 6% by weight relative to the weight of manganese-nickel mixed hydroxide powder. After completion of the reaction, the recovered particles were washed with water, filtered, and dried at 80° C. for 16 hours to obtain the particles coated with just nickel oxide. By SEM observation, checking of the coated material onto the particles was conducted.

From quantitative analysis, the nickel content at this stage was 6% by weight.

The particles obtained were used for producing the model cell by the method described in Example 1, and a discharge utilization of the model cell was then determined.

The results are shown in Table 1.

COMPARISON EXAMPLE—3

1,000 ml of an aqueous solution of cobalt sulfate at a concentration of 0.06 mol/l were prepared, and 60 g of manganese-nickel mixed hydroxide in particles were then dispersed in the solution and stirred at an ambient temperature. Then, aqueous solution of sodium hydroxide was fed into aqueous solution of cobalt sulfate up to a ratio of the amount of alkaline ions to that of cobalt ions in the cobalt sulfate solution of 1:2.3. At the same time, ammonia solution was fed into aqueous solution of cobalt sulfate up to a ratio of the amount of ammonium ions to that of cobalt ions in the cobalt sulfate solution of 1:2. The cobalt content obtained at this stage was 6% by weight relative to the weight of manganese-nickel mixed hydroxide powder. After completion of the reaction, the removed particles were washed with water, filtered, and dried at 80° C. for 16 hours to obtain the particles coated with just cobalt oxide. By SEM observation, a flocculated lump of fine particles, which was likely cobalt oxide and was different from the dispersed particles, was observed. From the result of quantitative analysis, the cobalt content at this stage was 6% by weight.

The particles obtained were used for producing the model cell by the method described in Example 1, and a discharge utilization of the model cell was then determined.

The results are shown in Table 1.

COMPARISON EXAMPLE—4

1,000 ml of an aqueous solution of nickel sulfate at a concentration of 0.002 mol/l, 1,000 ml of an aqueous solution of cobalt sulfate at a concentration of 0.01 mol/l and 60 g of manganese-nickel mixed hydroxide in particles were prepared. Using the same method as described in Example 1, two layers respectively composed of nickel oxide and cobalt oxide were coated on the surface of the mixed hydroxide in particles. The nickel content and the cobalt content obtained at this stage were 0.2% by weight and 1% by weight, respectively, relative to the weight of the manganese-nickel mixed hydroxide powder. By SEM observation, checking of the coated material onto the particles was conducted. From quantitative analysis, the nickel content and the cobalt content at this stage were found to be 0.2% by weight and 1% by weight, respectively.

The particles obtained were used for producing the model cell by the method described in Example 1, and a discharge utilization of the model cell was then determined.

The results are shown in Table 1.

COMPARISON EXAMPLE—5

1,000 ml of an aqueous solution of nickel sulfate at a concentration of 0.02 mol/l, 1,000 ml of an aqueous solution of cobalt sulfate at a concentration of 0.1 mol/l and 60 g of manganese-nickel mixed hydroxide in particles were prepared. Using to the same method as described in Example 1, two layers respectively composed of nickel oxide and cobalt oxide were coated on the surface of the mixed hydroxide in particles. The nickel content and the cobalt content obtained at this stage were 2% by weight and 10% by weight, respectively, relative to the weight of the manganese-nickel mixed hydroxide powder. By SEM observation, a flocculated lump of the fine particles having not been coated were observed separately from the coated particles. From quantitative analysis, the nickel content and the cobalt content at this stage were found to be 2% by weight and 10% by weight, respectively.

The particles obtained were used for producing the model cell by the method described in Example 1, and a discharge utilization of the model cell was then determined.

The results are shown in Table 1.

COMPARISON EXAMPLE—6

1,000 ml of an aqueous solution of nickel sulfate at a concentration of 0.02 mol/l, 1,000 ml of an aqueous solution of cobalt sulfate at a concentration of 0.1 mol/l and 60 g of manganese-nickel mixed hydroxide in particles were prepared. Using the same method as described in Example 1, two layers respectively composed of nickel oxide and cobalt oxide were coated onto the surface of the mixed hydroxide in particles. The nickel content and the cobalt content obtained at this stage were 0.2% by weight and 5.8% by weight, respectively, relative to the weight of the manganese-nickel mixed hydroxide powder. By SEM observation, a flocculated lump of the fine particles having not been coated were observed separately from the coated particles. From quantitative analysis, the nickel content and the cobalt content at this stage were found to be 2% by weight and 5.8% by weight, respectively.

The particles obtained were used for producing the model cell by the method described in Example 1, and a discharge utilization of the model cell was then determined.

The results are shown in Table 1.

EXAMPLE COMPARISON—7

1,000 ml of an aqueous solution of nickel sulfate at a concentration of 0.02 mol/l, 1,000 ml of an aqueous solution of cobalt sulfate at a concentration of 0.1 mol/l and 60 g of manganese-nickel mixed hydroxide in particles were prepared. Using to the same method as described in Example 1, two layers respectively composed of nickel oxide and cobalt oxide were coated onto the surface of the mixed hydroxide in particles. The nickel content and the cobalt content obtained at this stage were 1.5% by weight and 4.5% by weight, respectively, relative to the weight of the manganese-nickel mixed hydroxide powder. By SEM observation, a flocculated lump of the fine particles having not been coated was observed separately from the coated particles. From quantitative analysis, the nickel content and the cobalt content at this stage were 1.5% by weight and 4.5% by weight, respectively.

The particles obtained were used for producing the model cell by the method described in Example 1, and a discharge utilization of the model cell was then determined.

The results are shown in Table 1.

TABLE 1

|  | Nickel Content (% by Weight) | Cobalt Content (% by Weight) | Discharge Utilization | | 0.2 C/1.0 C Capacity Maintenance Rate (%) |
| --- | --- | --- | --- | --- | --- |
|  |  |  | 0.2 C (%) | 1 C (%) |  |
| Example 1 | 1 | 5 | 133 | 125 | 94 |
| Example 2 | 1 | 5 | 136 | 128 | 94 |
| Example 3 | 0.5 | 2.5 | 130 | 123 | 95 |
| Example 4 | 0.5 | 5.5 | 136 | 127 | 93 |
| Comparison Example - 1 | 0 | 0 | 132 | 115 | 87 |
| Comparison Example - 2 | 6 | 0 | 115 | 100 | 87 |
| Comparison Example - 3 | 0 | 6 | 127 | 110 | 87 |
| Comparison Example - 4 | 0.2 | 1 | 118 | 110 | 93 |
| Comparison Example - 5 | 2 | 10 | 122 | 105 | 86 |
| Comparison Example - 6 | 0.2 | 5.8 | 130 | 110 | 85 |
| Comparison Example - 7 | 1.5 | 4.5 | 126 | 105 | 83 |

As shown in Table 1, according to the present invention, it is demonstrated that the inventive manganese-nickel mixed hydroxide, which was coated either with nickel oxide layer or cobalt oxide layer, can gain greatly-improved discharge utilization and maintenance rate.

EXAMPLE 5

<Coating of Double Layers Respectively Composed of Nickel Oxide and Cobalt Oxide onto the Surface of Manganese-nickel Mixed Hydroxide in Particles>

In this example, for the manganese-nickel mixed hydroxide, the one prepared by the process specified in Example 1 was used.

One liter of ammonia solution at a concentration of 1 mol/l, 1.29 g of a basic nickel-ammonia complex solution wherein nickel sulfate and 5.16 g of sodium hydroxide were dissolved and aqueous solution of cobalt sulfate at a concentration of 0.1 mol/l were prepared.

The basic nickel-ammonia complex solution and manganesenickel mixed hydroxide powder in an amount of 35 g were placed in a closed container provided with a gas entry therein and the mixture was then stirred.

Nitrogen gas was fed into the container by bubbling at a speed of 1 liter/min., and an aqueous solution of cobalt sulfate prepared beforehand was fed dropwise into the container for 100 min. at a speed of 4.5 ml/min.

The nickel content and the cobalt content obtained at this stage were 0.7% by weight and 6.3% by weight, respectively, relative to the weight of the manganese-nickel mixed hydroxide powder.

The recovered particles after completing the reaction were washed with water, filtered and then dried at 80° C. for 16 hours to obtain nickel hydroxide in particles coated with a mixed-oxide of nickel and cobalt.

The state of the coated layer on the surface of the particles was checked by SEM observation.

From quantitative analysis, the nickel content and the cobalt content at this stage were 0.7% by weight and 6.3% by weight, respectively, those which corresponds to the expected values.

The tap density was 2.2 g/cc.

10 g of the particles obtained were prepared into a paste state, filled into a porous nickel collector and then dried to prepare a pressed nickel electrode.

A model cell shown in FIG. 1 was produced by using a hydrogen storage alloy electrode for an counter electrode and aqueous solution of potassium hydroxide at a concentration of 7.2 mol/l for an electrolyte.

A discharge capacity was determined after charging with current equivalent to 0.1 C for 18 hours and subsequently discharging with current equivalent to 0.2 C up to 0.5 V.

Fixing the theoretical capacity at oxidizing and reducing one electron to 100, a discharge utilization was determined based on the calculation which divides the discharge capacity actually obtained by the theoretical capacity.

On the other hand, as to highly-efficient charging and discharging property, a discharge capacity and a discharge utilization were determined by charging with current equivalent to 2 C for 0.9 hour, then discharging with current equivalent to 2 C up to 0.5 V, then charging with current equivalent to 1 C for 1.8 hour, and further discharging with current equivalent to 1 C up to 0.5 V.

The results are shown in Table 2.

EXAMPLE 6

One liter of ammonia solution at a concentration of 1 mol/l, a basic nickel-ammonia complex solution wherein 1.29 g of nickel sulfate were dissolved and aqueous solution of cobalt sulfate at a concentration of 0.1 mol/l were prepared. The basic nickel-ammonia complex solution and 35 g of manganese-nickel mixed hydroxide powder were placed in a closed container provided with a gas entry therein and the mixture was then stirred.

Nitrogen gas was fed into the container by bubbling at a speed of 1 liter/min., and an aqueous solution of cobalt sulfate prepared beforehand and aqueous solution of sodium hydroxide were fed dropwise into the container for 100 min. at a speed of 4.5 ml/min. and 2.5 ml/min., respectively.

The nickel content and the cobalt content obtained at this stage were 0.7% by weight and 6.3% by weight, respectively, relative to the weight of the manganese-nickel mixed hydroxide powder.

The recovered particles after completing the reaction were washed with water, filtered and then dried at 80° C. for 16 hours to obtain nickel hydroxide particles coated with a mixed-oxide of nickel and cobalt.

Here, the state of the coated layer onto the surface of the particles was checked by SEM observation.

From quantitative analysis, the nickel content and the cobalt content at this stage were 0.7% by weight and 6.3% by weight, respectively, those which corresponds to the expected values.

The tap density was 2.2 g/cc.

A model cell was produced by using the particles obtained by the process described in Example 5, and a discharge utilization was determined.

The results are shown in Table 2.

COMPARISON EXAMPLE—8

1,000 ml of aqueous mixed-solution of nickel sulfate and cobalt sulfate at a concentration of 0.05 mol/l (Ratio of Ni/Co, 1:9) were prepared, and 35 g of manganese-nickel mixed hydroxide in particles were added to the solution and the mixture was then stirred.

Nitrogen gas was fed into a container by bubbling at a speed of 1 liter/min., and aqueous solution of sodium hydroxide at a concentration of 0.5 mol/l was fed into the container at a speed of 2.5 ml/min. and 5N ammonia solution was also fed therein concurrently at a speed of 2 ml/min. The nickel content and the cobalt content obtained at this stage were 0.7% by weight and 6.3% by weight, respectively, relative to the weight of manganese-nickel mixed hydroxide powder.

The recovered particles after completing the reaction were washed with water, filtered and then dried at 80° C. for 16 hours to obtain nickel hydroxide in particles coated with a mixed-oxide of nickel and cobalt.

Here, the state of the coated layer onto the surface of the particles is checked by SEM observation.

From quantitative analysis, the nickel content and the cobalt content at this stage were 0.7% by weight and 6.3% by weight, respectively, those which corresponds to the expected values.

The tap density was 1.7 g/cc.

A model cell was produced by using the particles obtained by the process described in Example 5, and a discharge utilization was determined.

The results are shown in Table 2.

COMPARISON EXAMPLE—9

All procedures described in Example 6, except the feeding of aqueous solution of sodium hydroxide into a container was not made, were used to obtain manganese-nickel mixed hydroxide in particles coated with a layer composed of a mixed-oxide of nickel and cobalt.

From quantitative analysis on the obtained particles, it was demonstrated that the nickel content and the cobalt content were 0.21% by weight and 0.24% by weight, respectively, relative to the weight of manganese-nickel mixed hydroxide powder and therefore that the coating was not successfully made.

COMPARISON EXAMPLE—10

All procedures described in Example 5, except the feeding of nitrogen gas into a reactor was not done, were followed to obtain manganese-nickel mixed hydroxide in particles having a coated layer composed of a mixed-oxide of nickel and cobalt.

The tap density of the particles obtained was 1.8 g/cc.

A model cell was produced by using the particles obtained by the procedure described in Example 5, and a discharge utilization thereof was determined.

The results are shown in Table 2.

| | Tap Density (g/cc) | 0.2 C Discharge Utilization (%) | 1.0 C Discharge Utilization (%) | 2.0 C Discharge Utilization (%) | 0.2 C/2.0 C Capacity Maintenance Rate (%) |
|---|---|---|---|---|---|
| Example 5 | 2.2 | 140 | 135 | 129 | 92 |
| Example 6 | 2.2 | 138 | 134 | 128 | 93 |
| Comparison Example - 8 | 1.7 | 135 | 124 | 113 | 83 |
| Comparison Example - 10 | 1.8 | 132 | 121 | 106 | 80 |

According to Example 5, the mixed-oxide can precipitate in a high density state onto the surface of the suspended particles while reacting with nickel in a highly-alkaline solution, because pH of the solution cannot be led down sharply even receiving a dropping of the cobalt solution owing to the use of nickel-ammonia complex solution which had been in highly-alkaline state by the addition of sodium hydroxide. Therefore, the formation of good coated layers thereon can be provided, which further provided an improved discharge utilization of the nickel hydroxide complex while keeping the high tap density thereof.

Whereas, in Example 6, the coated layer with the mixed-hydroxide in a high density, which was the same as described in Example 1, can be formed, because the addition of sodium hydroxide in a fixed amount was done together with the prior addition of cobalt sulfate even though the addition of sodium hydroxide was not done beforehand, whereby the improvement in the discharge utilization of the nickel hydroxide complex while keeping the tap density thereof was allowable.

On the other hand, in Example 8, the precipitation of the mixed-oxide of nickel and cobalt starts from a low pH range during reaction, because both sodium hydroxide and ammonia were added to cobalt sulfate solution containing nickel. Thus it became difficult to obtain the coated layer with the complex of oxides in high density, which led to the low tap density and lower discharge utilization than the one prepared in Example 5.

In Example 9, since the reaction was carried out without adding an alkaline solution, pH of the solution rapidly went down when the cobalt solution was added, and the precipitation of the mixed-oxide of nickel and cobalt was thereby reduced, which led to mostly no formation of a coated layer.

In Example 10, the reaction was effected without feeding nitrogen gas into a reactor, and therefore, cobalt ions were oxidized by dissolved oxygen, whereby the precipitation of the mixed-hydroxide in low density was induced, and the tap density and the discharge utilization of the obtained particles became lower than the one prepared in Example 5.

The entire disclosure of Japanese Patent Application No. 10-53312 filed on Mar. 5, 1998, and Japanese Patent Application No. 10-114545 filed on Apr. 24, 1998 including specification, claims, drawings and summary are incorporated herein by reference in their entirety.

While the present invention has been described in the foregoing fashion, it is to be understood that the invention is not limited thereby, but may be varied in many other ways. Such variations are not to be regarded as a departure from the sprit and scope of the invention, and all such modifications as would be obvious to one skilled in the art are intended to be included within the scope of the following claims.

What is claimed is:

1. A manganese-nickel mixed hydroxide for battery active material wherein the mixed hydroxide contains 5 to 15 mole % of manganese and has a coated layer composed of a mixed-oxide containing nickel and cobalt on the surface.

2. The manganese-nickel mixed hydroxide for battery active material of claim 1, wherein the metal content in the coated layer composed of the mixed-oxide is in a range of from 2% by weight to 10% by weight relative to the amount of the mixed hydroxide.

3. The manganese-nickel mixed hydroxide for battery active material of claim 1, wherein the nickel content in the coated layer composed of an oxide is in a range of from 5% by weight to 20% by weight, relative to the amount of a metal contained in the coated layer.

4. A process for preparing the manganese-nickel mixed hydroxide for battery active material of claim 1 comprising suspending the manganese-nickel mixed hydroxide into an aqueous solution containing a nickel salt, coprecipitating and coating the nickel oxide onto the surface of the suspended particles of the mixed hydroxide while continuously feeding an alkaline solution and an aqueous solution containing ammonium ions, suspending the coated particles into an aqueous solution containing a cobalt salt, and precipitating and coating the cobalt oxide onto the surface of the suspended particles while continuously feeding an alkaline solution and an aqueous solution containing ammonium ions.

5. A process for preparing the manganese-nickel mixed hydroxide for battery active material of claim 1 comprising suspending the manganese-nickel mixed hydroxide into an aqueous solution containing a nickel salt and a cobalt salt, and coprecipitating and coating the mixed-oxide of nickel and cobalt onto the surface of the suspended particles of the mixed hydroxide while continuously feeding an alkaline solution and an aqueous solution containing ammonium ions.

6. A process for preparing the manganese-nickel mixed hydroxide for battery active material of claim 1 comprising suspending manganese-nickel mixed hydroxide powder in a basic nickel-ammonia complex solution, continuously feeding a cobalt solution in to the complex solution in the presence of an alkaline solution, and coprecipitating the mixed-oxide of nickel and cobalt onto the surface of the active material to form a coated layer with the mixed-oxide on the surface.

7. The process of claim 6 comprising suspending manganese-nickel mixed hydroxide powder in a basic nickel-ammonia complex solution, continuously feeding a cobalt solution into the nickel-ammonia complex solution in the presence of an alkaline solution, and precipitating the mixed-oxide of nickel and cobalt onto the surface of the mixed-hydroxide in particles to form a coated layer composed of the the mixed-oxide on the surface.

8. The process of claim 7, wherein the alkaline solution is added into the basic nickel-ammonia complex solution and further added into the cobalt solution, too.

9. The process of claim 7, wherein the coating process with mixed-oxide of nickel and cobalt is carried out under inert gas atmosphere.

* * * * *